United States Patent [19]

Harris et al.

[11] 4,062,591
[45] Dec. 13, 1977

[54] BARROW

[76] Inventors: David Harris; Jessie Harris, both of 48 Great Northern Highway, Middle Swan, Australia

[21] Appl. No.: 639,108

[22] Filed: Dec. 9, 1975

[30] Foreign Application Priority Data

Dec. 11, 1974 Australia .................. 9965/74

[51] Int. Cl.² .............................................. B62B 1/04
[52] U.S. Cl. ............................................................ 298/2
[58] Field of Search ................ 280/47.26; 298/2, 3; 37/130, 123; 180/19 R

[56] References Cited

U.S. PATENT DOCUMENTS

| 1,298,126 | 3/1919 | Vessey | 37/130 |
| 2,965,910 | 12/1960 | Van Ranst | 298/2 |
| 3,037,308 | 6/1962 | Miller | 37/130 |
| 3,281,186 | 10/1966 | Davis | 180/19 R |
| 3,594,932 | 7/1971 | Eriksson | 298/2 X |

Primary Examiner—Joseph F. Peters, Jr.
Assistant Examiner—John A. Pekar
Attorney, Agent, or Firm—Haseltine, Lake & Waters

[57] ABSTRACT

A barrow comprising a wheeled frame, a hopper pivotally mounted on the frame, a handle member pivotally connected to the frame, latch means provided between the hopper and the frame to enable the hopper to be selectively pivoted about a substantially horizontal transverse axis of the frame, and/or a second latch means provided between the handle member and the frame to enable the handle to be selectively pivoted about a substantially horizontal axis of the frame.

1 Claim, 4 Drawing Figures

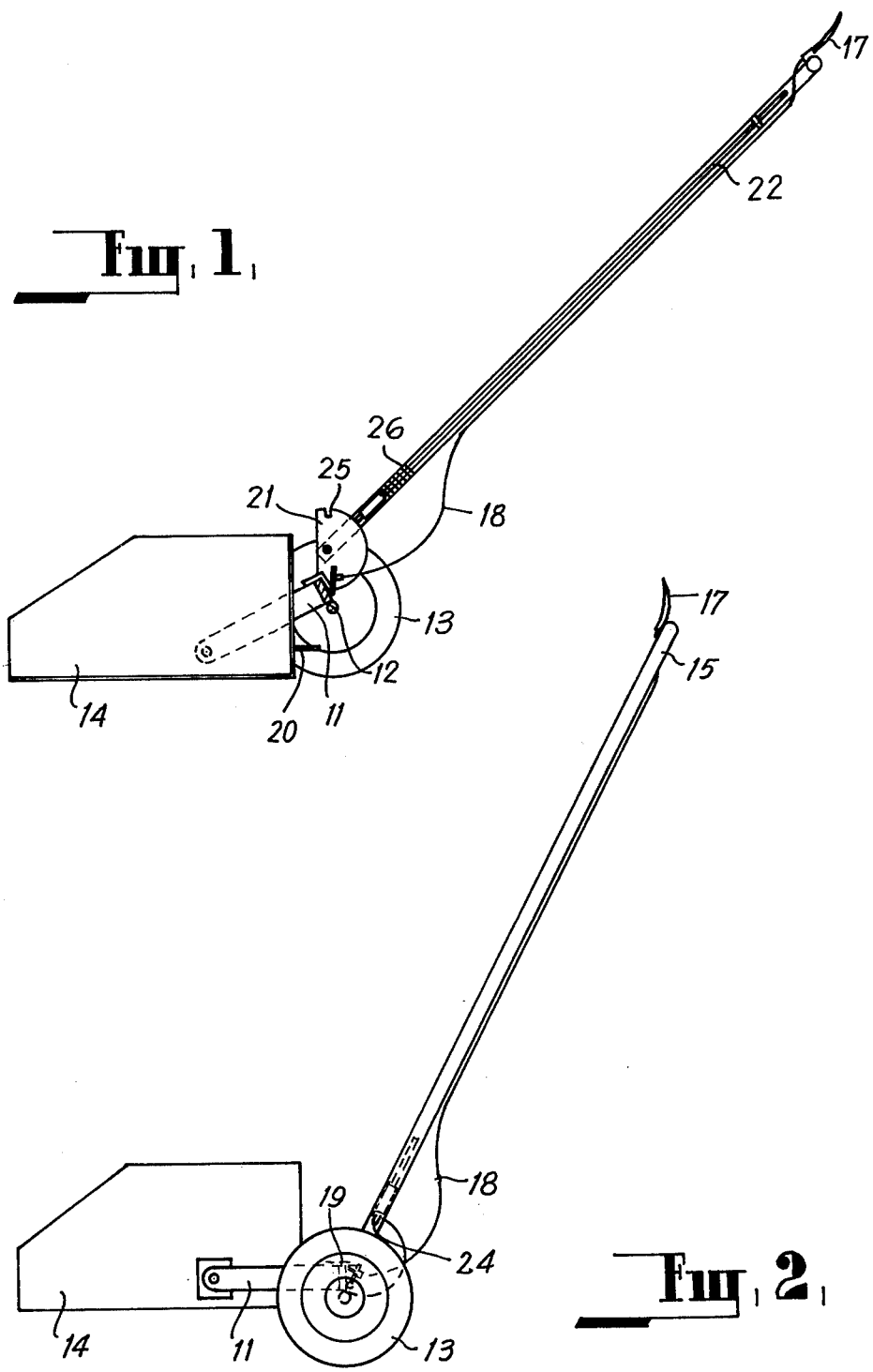

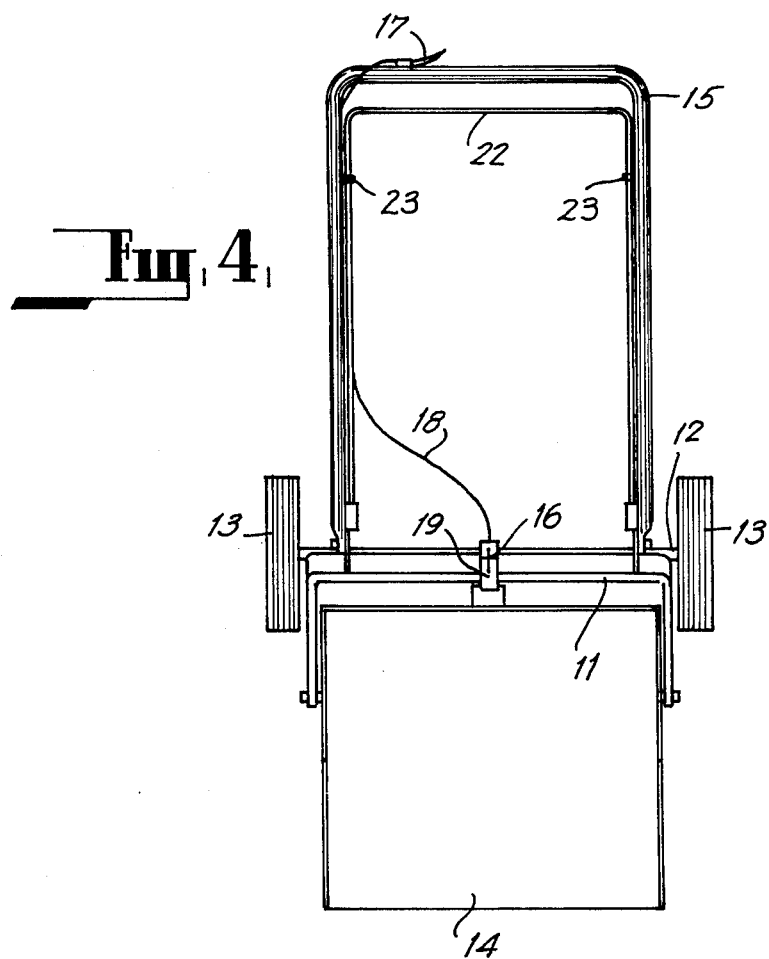

BARROW

This invention relates to an improved wheel barrow.

It is an object of this invention to provide an improved barrow which is easily operated to enable materials such as sand, gravel, cement and garden refuse to be loaded by forward movement of the barrow, and unloaded by allowing the bucket of the barrow to tip about a horizontal axis.

In one form the invention resides in a barrow comprising a wheeled frame, a hopper pivotally mounted on the frame, a handle member pivotally connected to the frame, latch means provided between the hopper and the frame to enable the hopper to be selectively pivotted about a substantially horizontal transverse axis of the frame and/or a second latch means provided between the handle member and the frame to enable the handle member to be selectively pivotted about a substantially horizontal transverse axis of the frame.

The invention will be better understood by reference to the following description of one specific embodiment thereof as shown in the accompanying drawings wherein:

FIG. 1 is a side elevation showing the barrow in a loading position;

FIG. 2 is a side elevation showing the barrow in a carrying position;

FIG. 3 is a side elevation showing the barrow in a tipping position; and

FIG. 4 is a plan view of the barrow.

As shown in the drawings, the barrow comprises a frame member 11 onto which is transversely mounted an axle 12 having wheels 13. A hopper or scoop 14 is pivotally mounted to the frame 11. The hopper 14 has raised rear and side walls and an open front end. The forward portion of each side wall slopes downwardly towards the front end. A substantially inverted U-shaped handle member 15 is pivotally connected to the frame member. A latch means 16 is provided on the frame member 11 to allow the hopper to be selectively pivotted about a substantially horizontal transverse axis of the frame. The latch means 16 is actuated by a lever 17 mounted on the handle member 15; a cable 18 connects the lever 17 to the latch means 16. The latch means 16 consists of a catch member 19 which engages against a stop 20 on the hopper; the catch member is biased to its outermost position by a spring (not shown). The outer face of the catch member 19 is sloped downwardly and outwardly to enable the hopper to be self locking on returning from the tipping position. As the hopper returns from the tipping position, the stop member 20 strikes the outer face of the catch member, 19 forcing the catch inwards against the force of the spring; once the stop member has passed the catch member, the spring returns the catch member to its outermost position thus locking the hopper in the carry position. The substantially inverted U-shaped handle 15 is pivotally connected to pawls 21 on the frame member 11. A substantially inverted U-shaped lever 22 is slidably positioned within the handle 15 by guides 23. Each free end of the lever 22 has a dog 24 mounted thereon to engage into slots 25 in the pawls 21 and hence allow the handle 15 to be locked in position relative to the frame member 11. A spring 26 is provided on each arm of the lever 22 to bias the dogs 24 into the slots 25. When the lever 22 is lifted to disengage the dogs from the pawls on the frame, the frame pivots under its own weight about a substantially horizontal transverse axis and hence the hopper drops to ground level. This is the loading position for the barrow. To return the hopper to the carry position the handle 15 is rotated upwardly about its pivot points on the frame so that the dogs re-engage in the slots of the pawls.

In use the barrow is wheeled to the material to be transported and the lever 22 lifted so that the dogs 24 disengage from the pawls 21 allowing the hopper to drop to ground level as shown in FIG. 1 of the drawings. The barrow is then pushed forward to load the material into the hopper. Once loaded, the hopper is returned to the carry position (as shown in FIG. 2) by rotating the handle 15 upwardly about its pivot points on the frame so that the dogs 24 re-engage in the pawls 21 under the force of the springs 26 on the lever 22. The barrow can then be wheeled to the area where the material is to be unloaded. For unloading, the lever 17 is depressed, thus moving the catch member 19 inwardly and allowing the hopper to rotate about a substantially transverse axis of the frame 11. If required the barrow may be lifted off the ground to allow the hopper to pivot to an unloading position as shown in FIG. 3. In this position the downwardly sloping portions of the side walls rest on the ground. As the hopper returns to the carry position, the stop member 20 strikes the outer face of the catch member 19, forcing the catch member inwards against the force of the spring. Once the stop 20 has passed to catch member 19 the spring returns the catch member to its outermost position thus locking the hopper in the carry position.

Although this invention has been described with reference to one specific embodiment it is not limited thereto, and may be altered somewhat without departng from the scope of the invention.

We claim:

1. A barrow apparatus including a wheeled frame, a hopper pivotally mounted on the frame for movement about a transverse horizontal axis, a handle member pivotally connected to the frame, latch means disposed between the hopper and the frame, said latch means being defined by a catch member on said frame engaging against a stop means on said hopper, said catch member being spring biased to its outermost latching position, the outer face of the latch member being downwardly and outwardly sloped to permit said catch member to move away from the stop means and allow the hopper to pivot about said transverse horizontal axis; and second latch means disposed between the handle member and the frame defined by a pawl mounted on said frame and coacting with dog means connected to said handle for selectively pivoting and positioning said handle along a substantially horizontal axis with respect to the frame.

* * * * *